June 5, 1923.
G. H. PRESCETT
1,457,747
PIN GUARD FOR TRAILER HITCHES
Filed Nov. 30, 1921
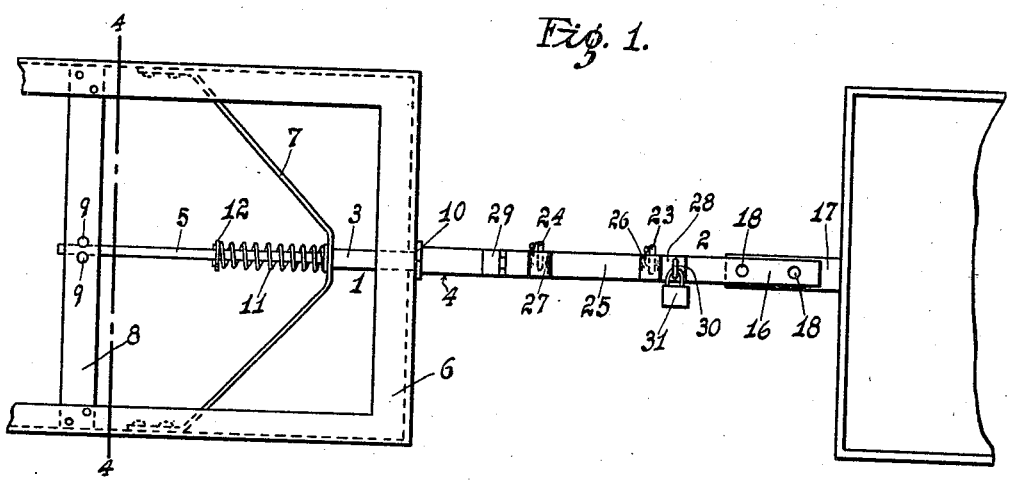
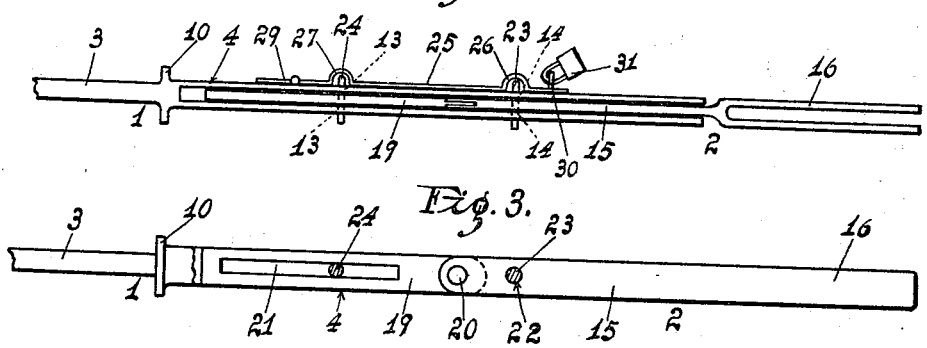
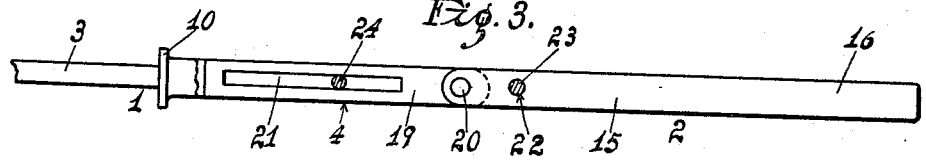
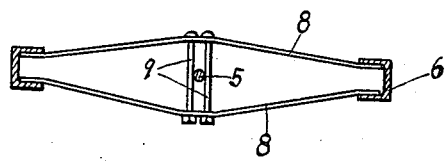
Inventor
George H. Prescett.
By Harry Schroeder
Attorney Patented June 5, 1923.

1,457,747

UNITED STATES PATENT OFFICE.

GEORGE H. PRESCETT, OF OAKLAND, CALIFORNIA.

PIN GUARD FOR TRAILER HITCHES.

Application filed November 30, 1921. Serial No. 518,830.

*To all whom it may concern:*

Be it known that I, GEORGE H. PRESCETT, a citizen of the United States, residing at Oakland, in the county of Alameda and State of California, have invented certain new and useful Improvements in Pin Guards for Trailer Hitches, of which the following is a specification.

My invention is a pin guard for trailer hitches which may be readily placed over the hitch connecting pins and locked to prevent the pins from being lost or surreptitiously removed, but may be unlocked with a key by the proper persons to remove said pins to disconnect the hitch when so desired.

Referring to the annexed drawing in which my invention is illustrated and which forms a part of this specification:

Figure 1 is a plan view of a trailer hitch showing a trailer hitched thereby to an automobile, and my guard locked over the hitch pins.

Figure 2 is a side view of the hitch and my guard locked over the hitch pins.

Figure 3 is a plan view of the hitch partly broken away, showing the hitch pins in section.

Figure 4 is a cross section of the automobile chassis taken on line 4—4 of Figure 1.

A trailer hitch as shown in the drawing includes a forked member 1 and a tongue member 2. The forked member 1 is constructed with a short bar 3, a fork 4 extending from the rear end of said bar, and a shank 5 extending from the forward end of said bar. The bar 3 extends through the rear member of an automobile chassis 6 and through a V-shaped bar 7 midway of the end of said bar, which bar extends transversely of the chassis, converging rearwardly and is secured at its ends to the side members of said chassis. A pair of superimposed brace bars 8 extend transversely of the chassis and are secured at their ends to the side members of the chassis. The members 8 are connected together midway of their ends by bolts 9 between which extends the forward end of the shank 5. The hitch member 1 has a shoulder 10 at the juncture of the bar 3 and fork 4. A spring 11 surrounds the shank 5 between the forward side of the V-bar 7 and a collar 12 secured on the shank, which spring normally holds the hitch member 1 in its forward position with the shoulder 10 engaging the rear member of the chassis. The members of the fork 4 are superimposed and have pin holes 13 and 14. The hitch member 2 is constructed with a shank 15 and with a fork 16 projecting rearwardly from said shank, which fork straddles a tongue 17 on the front of the trailer and is secured to said tongue by bolts 18. A hinge member 19 is hinged to the forward end of shank 15 by a hinge pin 20 and has a longitudinal slot 21. The shank 15 has a pin hole 22 near its forward end. The hinge member 19 and shank 15 extend between the members of fork 4. A coupling pin 23 extends through the pin holes 14 in the members of fork 4 and the pin hole 22 in the shank 15. A coupling pin 24 extends through the pin holes 13 in the members of fork 4 and the slot 21.

My pin guard comprises a strip of metal 25, pressed upwardly into arches 26 and 27 and provided with a transverse slot 28 at one end, the other end thereof being hinged by a hinge 29 to the upper side of the upper member of the fork 4 so that it normally rests on said upper side of said upper fork member with said arches over the heads of the pins 23 and 24 and with a staple 30 in said upper fork member projecting through the slot 28. The guard is locked in position by a lock 31 which is extended through the staple 30. The arches 26 and 27 prevent the pins 24 and 25 from coming out of place.

Having described my invention, I claim:

1. In combination with a trailer hitch, pins on said hitch a pin guard formed with a flat body and mounted on said hitch to prevent the coupling pins thereof from coming out of place.

2. In combination with a trailer hitch, pins on said hitch a pin guard formed with two arches, and means for locking said guard on the hitch with said arches over the heads of the pins.

3. In combination with a trailer hitch, pins on said hitch a staple on said hitch, a pin guard formed with two arches and a slot at one end, the other end of the guard being hinged to the hitch so that said arches rest over the heads of the pins, and said staple projects through said slot, and a lock extended through said staple to lock the guard in position on the hitch over said pins.

In testimony whereof I affix my signature.

GEORGE H. PRESCETT.